United States Patent
Paterson et al.

(10) Patent No.: US 11,210,705 B1
(45) Date of Patent: Dec. 28, 2021

(54) SYSTEM AND METHOD FOR TRANSMITTING DIRECT ADVERTISING INFORMATION TO AN AUGMENTED REALITY DEVICE

(71) Applicant: United Services Automobile Association (USAA), San Antonio, TX (US)

(72) Inventors: Kevin G. Paterson, San Antonio, TX (US); Jordan A. Newmark, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1351 days.

(21) Appl. No.: 14/503,988

(22) Filed: Oct. 1, 2014

Related U.S. Application Data

(60) Provisional application No. 61/892,555, filed on Oct. 18, 2013.

(51) Int. Cl.
*G06Q 30/02* (2012.01)
*G06T 19/00* (2011.01)

(52) U.S. Cl.
CPC ..... *G06Q 30/0267* (2013.01); *G06Q 30/0261* (2013.01); *G06T 19/006* (2013.01)

(58) Field of Classification Search
CPC ............ G06Q 30/0267; G06Q 30/0261; G06T 19/006
See application file for complete search history.

(56) References Cited

U.S. PATENT DOCUMENTS

| | | | | |
|---|---|---|---|---|
| 6,330,446 | B1 * | 12/2001 | Mori | H04W 60/02 455/432.1 |
| 8,175,617 | B2 * | 5/2012 | Rodriguez | G01C 21/3629 455/456.1 |
| 8,595,847 | B2 * | 11/2013 | Petta | G06F 17/30864 709/229 |
| 8,644,842 | B2 * | 2/2014 | Arrasvuori | G06Q 30/00 455/404.2 |
| 9,055,509 | B2 * | 6/2015 | Macek | H04L 51/043 |
| 9,385,928 | B2 * | 7/2016 | Petta | G06F 17/30864 |
| 9,967,750 | B1 * | 5/2018 | Fernandez | H04W 12/12 |
| 2003/0126013 | A1 * | 7/2003 | Shand | G06Q 30/02 705/14.52 |
| 2005/0086110 | A1 * | 4/2005 | Haley | G06Q 30/02 705/14.52 |
| 2005/0148828 | A1 * | 7/2005 | Lindsay | A61B 5/00 600/300 |

(Continued)

FOREIGN PATENT DOCUMENTS

| | | | | |
|---|---|---|---|---|
| WO | WO-2012015956 | A2 * | 2/2012 | G06F 3/005 |

OTHER PUBLICATIONS

Fern'ndez et al., "On the Characterization of CAR Systems Based on Mobile Computing," 2012 IEEE 14th International Conference on High Performance Computing and Communication & 2012 IEEE 9th International Conference on Embedded Software and Systems, 2012, pp. 1205-1210, doi: 10.1109/HPCC.2012.177. (Year: 2012).*

*Primary Examiner* — Kambiz Abdi
*Assistant Examiner* — Dipen M Patel
(74) *Attorney, Agent, or Firm* — BakerHostetler

(57) ABSTRACT

The present invention provides a system and a method for delivering advertisement content perceptible by a user of an augmented reality device.

20 Claims, 3 Drawing Sheets

(56) References Cited

U.S. PATENT DOCUMENTS

| | | | |
|---|---|---|---|
| 2006/0206379 A1* | 9/2006 | Rosenberg | G06Q 30/02 705/14.54 |
| 2006/0253427 A1* | 11/2006 | Wu | G06F 17/3064 |
| 2008/0139183 A1* | 6/2008 | Keohane | H04M 1/6075 455/414.1 |
| 2010/0216509 A1* | 8/2010 | Riemer | H04M 1/72577 455/557 |
| 2011/0029370 A1* | 2/2011 | Roeding | G06Q 30/00 705/14.38 |
| 2012/0212499 A1* | 8/2012 | Haddick | G02B 27/0093 345/589 |
| 2014/0160055 A1* | 6/2014 | Margolis | G06F 1/163 345/174 |
| 2015/0220998 A1* | 8/2015 | Futa | G06Q 30/0241 705/14.66 |

\* cited by examiner

US 11,210,705 B1

SYSTEM AND METHOD FOR TRANSMITTING DIRECT ADVERTISING INFORMATION TO AN AUGMENTED REALITY DEVICE

CROSS-REFERENCE TO RELATED APPLICATIONS

The present invention claims the benefit of U.S. Provisional Patent Application No. 61/892,555 filed Oct. 18, 2013, the contents of which are incorporated herein by reference.

FIELD OF THE INVENTION

The present invention provides a system and method for automatically sending advertisement content to an augmented reality device for perception by a user.

BACKGROUND OF THE INVENTION

Augmented reality devices and applications are increasing in popularity. Many of the present augmented reality devices such as Yelp Monocle, Metro Paris, London Bus, overlay information onto a smartphone screen over images captured by the smartphone camera to provide helpful information such as train and bus schedules in the area of the captured images. Others have promoted movies with the use of video games. One such promotion required a user to focus a webcam at a card containing a marker and, when the video game software recognized the marker, a 3-D image of a character from the movie was overlaid on a backdrop where the character could be manipulated by the player of the game.

Google Glass public release is approaching which will allow for augmented reality overlays on a glass lens supported by a wearable wire frame, much like a pair of corrective eye glasses. With the advent of such devices and augmented reality applications there will be an ever increasing number of people who adopt these devices and applications as part of their daily routine. This trend creates an opportunity to direct very specific advertisement content to the users of these devices and applications in a manner that should have a high return of sales of products and services based on the number of ads sent and the amount of money spent on the advertising.

DETAILED DESCRIPTION

Figure 1:
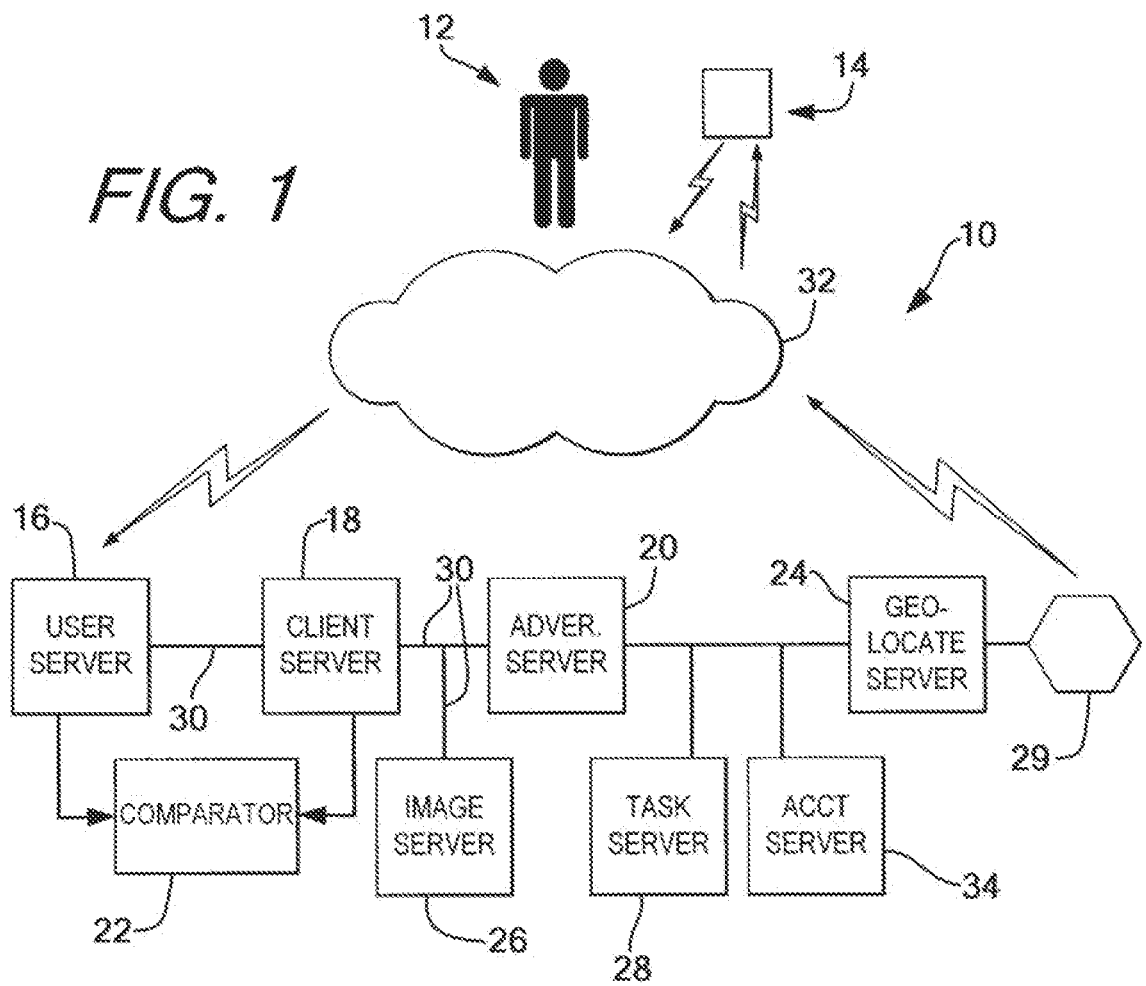
FIG. 1 is a diagrammatic representation of a system for transmitting advertisement content to an augmented reality device for perception by a user.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

The present invention provides a system and method for automatically transmitting advertisement content to an augmented reality device for perception by a user. The system and method can be used to carry out a direct advertisement campaign and particularly one that sends pertinent information to a user of an augmented reality device that has an enhanced probability of leading to a purchase by the user.

System

FIG. 1 shows an automated system 10 for delivering advertisement content perceptible by a user 12 of an augmented reality device (ARD) 14. The system 10 has, in a preferred form of the invention, at least one of the following servers: (a) a user-server 16 for gathering and storing target information about potential products and services needed, desired or appropriate for the user; (b) a geolocation-server 24 for gathering geolocation information of the augmented reality device; (c) an image-server 26 for gathering ambient image information from the augmented reality device; (d) or a task-server 28 for storing a library of events specified to trigger the transmission of advertisement content to the augmented reality device. FIG. 1 shows the system also has a client-server 18 configured to store identifying information of a sponsored product or a sponsored service available for use or sale by a seller. An advertisement-server 20 is configured to store advertisement content associated with each sponsored product or sponsored service. A comparator 22 is configured to correlate the identifying information with one of the target information, the geolocation information, the ambient image information, the events, or any combination thereof, to determine a degree of similarity and upon exceeding a pre-determined threshold value, selecting the advertisement content associated with the sponsored product or sponsored service. The system 10 also includes a communicator 29 for electronically transmitting the selected advertisement content to the augmented reality device through a medium 32.

The various servers do not have to be connected in any particular order or even be contained in separate housings so long as they are capable of electronic communication to achieve the goal of transmitting selected advertisement content to the user.

As will be discussed in greater detail below, advertisement content can be transmitted to an ARD in response to a correlation of target information and identifying information, in response to receiving geolocation information, in response to receiving ambient images, and in response to virtually any event specified.

Collecting Target Information

It is desirable to gather pertinent information about the user's needs, preferences, desires, or possible needs to select the most appropriate advertisement content to be transmitted to the user of the augmented reality device. Pertinent information can be gathered by requesting and receiving information from the user voluntarily, by gleaning information from the user's activities, collecting information about the user from other sources, or any combination of the same. The information gathered is stored on the user-server 16.

Pertinent information can include personal information, demographic information, Internet search terms used, Internet search history, cookies, purchase history, geolocation of the user, geolocation history of the user, the environment of the user, the ambient conditions in the user's location, mailing lists naming the user, subscription information, prescription information, membership information, and other information relied upon by one of ordinary skill in the art of advertising, and, more particularly, direct advertising.

Demographic information includes at least one point of data including: age, gender, education level, religion, nationality, height, weight, ethnicity, income level, marital status, own or rent primary residence, own or rent home, number of vehicles owned, types of vehicles, make of vehicles, model number of vehicles, model year of vehicles, and country of origin of vehicles.

Personal information can include any combination of the following: name, aliases, assets, debts, net worth, yearly income, income history, identity of family members, personal information of family members, friends, colleagues, profession, employer, employment history, sources of income, skills, language proficiencies, address, email address, phone number(s), age, gender, height, weight, body mass index, personal goals, medical conditions, allergies, phobias, work schedule, eating schedule, travel schedule, commuting schedule, sleep schedule, vacation schedule, daily routines, personal hygiene routines, recreation routines, hobby interests, dietary preferences, dietary restrictions, activity preferences, activity restrictions, exercise preferences, entertainment interests, musical interests, sports interests, media subscriptions, food preferences, restaurant preferences, product needs, product desires, service needs, service desires, memberships, marital status, number of years at present residence, residence history, electronic device use schedule, automated music recommendation service user preferences, on-demand Internet streaming media service preferences. An electronic-device-use schedule refers to a time schedule noting the time of day when an electronic device is in use and the length of time for each use for a period of time such as a day, a week, a month, a year, or any time period of interest, to quantify when an electronic device such as an ARD, cell phone, or any Internet access device is in most active use. Suitable automated music recommendation service includes, for example, PANDORA®. Suitable on-demand Internet streaming media service includes, for example, NETFLIX®.

Internet search terms of the user, Internet search history, and cookies can be captured in real time as the searches are conducted or by obtaining access to the temporary Internet files or other files maintained on the device used to conduct the searches. A purchase history of the user can be self-reported, gleaned from credit card use information, credit reporting sources or other sources.

The geolocation of the user can include varying levels of detail from precise coordinates that pinpoint the user's location within several feet, to city, state, region, or country level information. In a preferred form of the invention, the precision of geolocation information provided by a smartphone-type device or a GPS system is desired. The geolocation history can include any changes in geolocation over a long or short time frames including changes in location over seconds and minutes, to changes in residential locations that may occur over much longer periods of times such as a year or multiple years.

The environment of the user includes information such as whether the user is indoors or outdoors, in a home, store, restaurant, theater, or other location. The ambient conditions in the user's location includes information such as temperature, humidity, barometric pressure, dew point, wind speed, wind direction, sunny, cloudy, and other weather conditions.

Mailing lists naming the user, subscription information, membership information are typically available for purchase from the owners' of such lists. Such lists can include residential addresses, work addresses, and email addresses. Mailing lists can be for sending any type of information from which may be gleaned a user's interests in such matters as professional organizations or development, social, and recreational organizations and memberships; products and services, hobbies, dining and food preferences, physical and financial health topics, religion, politics, clubs, organizations, associations, and legal, for example. Subscriptions can include magazine subscriptions, catalog subscriptions, and others. Prescription information, in most instances, will have to be voluntarily reported and can include pharmaceutical prescriptions for drugs, devices, procedures, treatments and the like.

Recruiting Sellers

The client-server 18 is configured to store and organize information about products and services available for sale by a seller. Recruiting sellers to utilize the system and method of the present invention can include directly approaching sellers or by enticing the sellers to approach the entity. Recruiting sellers can include those steps taken to promote any product or service. For example, the entity can compile information of potential sponsored products and potential sponsored services from Internet searches, phone books, catalogs, advertisements, newspapers, magazines, television broadcasts, radio broadcasts, written publications, personal viewing of locations, automated music recommendation user preferences, and on-demand Internet streaming media preferences. The entity can then approach the sellers of suitable products and services. The entity can also advertise its system and service through disseminating information in any suitable manner known to those of ordinary skill in the art including the manner set forth herein, by disseminating written material, demonstration videos, spoken word, and the like. The entity can also recruit sellers by allowing online registration at a website sponsored by the entity.

In a preferred form of the invention, the sellers will be paid subscribers to the system and method of advertising described herein. To this end, the entity will negotiate an agreement with a subscriber to compensate the entity for sending advertisement content of the subscriber's sponsored product or sponsored service. Compensation schemes can include, for example, that the subscriber agrees to compensate the entity by paying a specified amount of money per advertisement message sent, paying a specified amount of money per sponsored product or sponsored service purchased by a user, paying a specified amount of money per monetary value of the sponsored product or sponsored service purchased by a user, paying a specified amount of money per specified period of time, paying a specified amount of money per user click on a hyperlink embedded in the advertisement to a seller website; per scan of a QR code or other compensation methodologies known to those of skill in the art. The accounting server 34 is configured to invoice the subscribers in a manner agreed upon with the subscriber such as on a periodic basis such as on a monthly, quarterly, yearly basis, for every specified number of advertisements sent or when a particular monetary value is reached, or other basis agreed upon by the entity and the subscriber.

The seller will provide to the entity identifying information about its product or service to be promoted and advertised. The identifying information can include any piece of information that is typically used to describe and promote a product or service for sale. The identifying information will be compared with target information of the user to determine if there is sufficient similarity to send a specific piece of advertisement content for a product or service that meets or is similar to products and services of interest, needed by, desired, or appropriate for the user. Identifying information can include, for example, a description of the appearance, image information representative of the product, function, size, style, pattern, shape, dimensions, color, weight, taste, smell, sound, benefit of owning, parts, how to use, price, purchase terms, technical specifications, materials, guarantees, warranties, expiration date, gender specific, trade name, trademark, manufacturer, reputation of the manufacturer or service provider, model year, model number, part number, power source, fuel source, electrical specifications, contents, accessories, location to purchase, location of the service, the time period of the service, and the results of the service.

Correlating

The comparator 22 compares target information with identifying information and upon finding sufficient similarity, transmits advertisement content associated with the identifying information to the augmented reality device. While an exact match or agreement between the target and identifying information will lead to advertisement content being transmitted to the augmented reality device, it is desirable to expand the definition of the identifying information, the target information or both, and then compare the enhanced definition of one to the normal definition of the other, or to compare the enhanced definitions of both. This will allow for advertisement content to be sent in response to a user's interest in a competitive product or service, a product in the same product or service category, or a sponsored product or sponsored service that is substitutable for the product or service subject of the target information.

In one preferred form of the invention, the target information, the identifying information, or both can be expanded by one of the following: (a) associating a product category or service category with each of the products or services subject of the identifying information or the target information; (b) associating a competitive product or a competitive service with each of the products or services subject of the identifying information or the target information; (c) associating a substitutable product or a substitutable service with each of the products or services subject of the identifying information or the target information; (d) associating a related product or a related service with each of the products or services subject of the identifying information or the target information; and (e) associating a keyword with each of the sponsored products or sponsored services or searching for a keyword in the target information.

Assigning product or service categories can be done by adopting a set of standards for organizing products and services into a plurality of categories where an individual category contains products or services that meet a similar user need, are inter-related, are substitutable, are competitive or are logistically manageable in a similar manner in a store or for import and export. Suitable standards can include at least one of the following: universal product codes standards, A.C. Nielsen product category designations, Schedule B numbers used by the U.S. to classify physical goods for export to another country and variations and adaptations of the same.

Universal product codes are widely used in the United States and elsewhere and utilize a bar code symbol with 12 numbers to uniquely identify a specific product. A seller can enhance its definition of identifying information by including UPC symbols that it wishes to trigger advertisement content for its products to be sent to the ARD.

A.C. Nielsen specifies product categories as set forth in the following table.

Alcohol

BEER
CIDER
LOW ALCOHOL BEER
WINE
WINE - FORTIFIED
WINE - RED BOTTLES
WINE - RED CASKS
WINE - SPARKLING
WINE - WHITE BOTTLES
WINE - WHITE CASKS

Apparel

HOSIERY
SOCKS
UNDERWEAR - FEMALE
UNDERWEAR - MALE

Automotive

MOTOR OIL

Baby Products

ANTIBACTERIAL TREATMENTS
BABY CEREALS
BABY CREAMS
BABY FOOD
BABY JELLIES
BABY JUICES
BABY MEDICATIONS
BABY RUSKS
DISPOSABLE BABY NAPPIES
DISPOSABLE NAPPY LINERS
IDISPOSABLE TRAINING PANTS

Household Products

AIR FRESHENERS
ANTISEPTIC LIQUIDS
AUTOMATIC DISHWASH DETERGENTS
CARPET CLEANERS
CLOTHS & WIPES
DISHWASHER ACCESSORIES
DISINFECTANTS
DRAIN CLEANERS
DRY SUFACE CLEANERS
FABRIC PROTECTORS
FABRIC REFRESHERS
FABRIC SOFTENERS
FINE FABRIC WASHES
FURNITURE POLISH
HEAVY DUTY DETERGENTS
HEAVY DUTY DETERGENTS - LIQUIDS
HEAVY DUTY DETERGENTS - POWDERS
HOUSEHOLD CLEANERS
HOUSEHOLD INSECTICIDES
IRONING AIDS/LAUNDRY STARCH
LAUNDRY SOAP
LIQUID BLEACHES
LIQUID DISHWASH DETERGENTS
METAL POLISH
MOULD REMOVERS/TREATMENTS

-continued

OVEN CLEANERS
POT SCOURERS
PREWASH STAIN REMOVERS
RAT BAITS & POISON
RINSE AIDS
TOILET CLEANERS
VITROCERAMICS

Shelf Stable Bakery Bisquits

ARTIFICIAL SWEETENERS
BAKING CUPS
BAKING FRUIT
BAKING JUICE
BAKING POWDER
BISCUITS
BISCUITS - ASSORTED
BISCUITS - CHILDRENS
BISCUITS - CRACKERS
BISCUITS - CREAM/JAM
BISCUITS - ENROBED
BISCUITS - PLAIN SWEET
BRAN
BREAD - BUNS & ROLLS
BREAD - LOAF
BREAD - SPECIALITY
BREADCRUMBS/COATINGS & STUFFING MIXES
CAKE DECORATIONS
CAKES (excl CHRISTMAS CAKES)
CITRIC ACID/BAKING SODA/CREAM OF TARTAR
COCOA & COOKING CHOCOLATE
COCONUT
CORNFLOUR
CRUMPETS/MUFFINS & PIKELETS
DRIED CAKE/COOKIE & PUDDING MIXES
DRIED FRUIT
EGGS
ESSENCES & COLOURINGS
FLOUR
GELATINE
GOLDEN SYRUP/TREACLE & MOLASSES
HOME YOGHURT MAKING PRODUCTS By associating these product category designations for each sponsored product or sponsored service it allows greater accuracy and flexibility in matching identifying information with target information. By having specific names for product categories text-based matching is improved. Thus, if a successful correlation of identifying information with target information requires at match, for example, between "Downy" in the identifying information and "Downey" in the target information, a potential match could be missed. However, if both names are grouped under Fabric Softeners, this problem will be avoided. Additionally, it may be desirable for an advertisement to be sent for a sponsored fabric softener product when target information describes a product under the categories, for example, Fabric Softener, Fabric Refresher, Fabric Protectors, and Heavy Duty Detergents. Thus, if target information describes a laundry detergent product such as TIDE®, an advertisement for a sponsored fabric softener may be transmitted to the ARD.

Schedule B numbers are administered by the U.S. Census Bureau, Foreign Trade Division, and rely on the International Harmonized System codes for their 4- and 6-digit headings and subheadings. The 4- and 6-digit Harmonized System are expanded to 10 digits under the Schedule B classification systems. The Harmonized System numbers are the same up to the first 6 digits as the importing country's classification code. There is a Schedule B number for every physical product, from paperclips to airplanes. Schedule B numbers can be searched by online search engines and can be found under 15 C.F.R. § 30.1 Schedule B which is incorporated in its entirety herein by reference and made a part hereof. Schedule B is organized into twenty two sections and 98 chapters. An example of a section heading is Section II Edible Vegetables which comprises Chapters 6-14. Chapter headings include, for example, Chapter 9 Coffee, Tea, Mate & Spices. Each chapter is then subdivided according to a schedule, with greater levels of detail like, caffeinated, decaffeinated and so on.

Associating Schedule B numbers with a sponsored product or sponsored services provides greater flexibility and accuracy when correlating the identifying information with the target information. Accuracy is improved as a specific number is associated with each product or service so the limitations inherent in text-based searches are avoided. One such limitation is if the correlation of target information and identifying information requires a match between two words, any misspellings can potentially lead to a missed match. Also, if the identifying information is not fully described or does not use exactly the right words, products and services subject of the target information may not find a textual match in the identifying information, which, in turn could result in a lost sale of a sponsored product or service. Additionally, Schedule B specifies numerical designations for broad categories of products to very narrow category of products. For example, tea has a Schedule B number of 09.02 and green tea 0902.10 0000. Thus, if a sponsored product is a green tea, it may be desirable to associate both Schedule B numbers 09.02 and 0902.10 0000 should the target information refer to a tea in general. Thus, the correlating and matching of sponsored products and services with products and services subject of the target information can be fine-tuned.

Advertisement Content

The advertisement-server 20 stores advertisement content for each sponsored product or service. The advertisement content can be in any form known to those skilled in the art of advertising and marketing and most preferably is in a form that can be electronically transmitted. Advertisement content can include, for example, any of the information that constitutes identifying information, graphical representation of the products or services, graphical representations to promote the product or service, photographs, static and dynamic images, videos, animations, audio recordings, slogans, jingles, coupons, and offers. The advertisement can be transmitted to a user in any form but most preferably comes in a form commonly used in Internet advertising and including display advertising, such as banner ads, frame ads, pop-ups, pop-unders, floating ads, expanding ads, trick banners, interstitial ads, text ads, and audible advertisement. Such ads can incorporate video, audio, animations, buttons, forms, or other interactive media supported by software such as Java applets, HTML5, Adobe Flash and other programs well known to those of ordinary skill in the art. The advertisement content can also include links to a digital wallet where, for example, a coupon can be accompanied by a button for depositing the coupon in a digital wallet.

Geolocation Information

FIG. 1 also shows an optional geolocation server 22 for storing information of the ARD's location. As set forth above, the geolocation of the ARD can include varying levels of detail from precise coordinates that pinpoint the ARD's location within several feet, to city, state, region, or country-level information. In a preferred form of the invention, the level of accuracy of geolocation information provided by a smartphone-type device or a GPS system is desired. The geolocation-server is configured to periodically request this information from the augmented reality device and to receive responses. The geolocation information of the ARD is compared to the geolocation of a seller to select appropriate advertisement content of a seller's product or service within a pre-set distance. A sufficiently close seller sometimes will be referred to as a proximal seller.

The rate of requesting and receiving geolocation information can be controlled, in part, by the geolocation server 22. The rate of requesting or receiving geolocation information from a user can be based on specified time period, a time of day, in accordance with a prescribed schedule or rate profile, a velocity of the reality device with respect to a specified standard, a change in altitude of the reality device, the distance between the seller location and the reality device, a distance from a Wi-Fi access point and the reality device, a distance from a cellular phone tower. A rate based on a specified time period can include a number of times per day, per hour, per minute or any pre-designated time period. A rate of requesting and receiving geolocation information can also vary based on the time of day. For example, during meal times, food and restaurant advertising can be timed to be received prior to a user dining. For example, if Prince-spaghetti-night is Wednesday, the rate of sending out Prince Spaghetti ads can start on Tuesday and end on Wednesday night.

The rate of requesting and receiving geolocation information can also vary based upon the speed of the augmented reality device, a change in altitude of the device, a specific location, proximity to a seller's location, distance from a Wi-Fi hot spot, the distance from a cell phone tower, the concentration of seller locations, and others. The rate of requesting or sending the geolocation information can vary in direct proportion, indirect proportion, or independently of these data points. For example, if the velocity of the augmented reality device is determined to be, say, 60 miles per hour, this is likely to mean the device is in a moving vehicle like a car, truck, bus, motorcycle or other. It may be desirable to increase the rate of advertising such items as gasoline stations, restaurants, shopping malls or other in direct proportion with the speed of the vehicle. Also, in a preferred form of the invention, it may be desirable to send a higher concentration of audio files over visual files in the event the user of the device is driving Image information.

FIG. 1 also shows an image-server 26 to store trigger images associated with a sponsored product or a sponsored service, and ambient images collected by the augmented reality device and received by the image-server 26. The image-server may sometimes be referred to as a trigger image server and an ambient image server. The image server 26 is also configured to correlate trigger images with ambient images to determine a degree of similarity based on a set of instructions. These instructions can be implemented with image comparison software well known to those of skill in the art and sometimes this server will be referred to as an image-comparison server. When the degree of similarity exceeds a pre-determined set point, advertisement content from the product or service associated with the trigger image is transmitted to the augmented reality device by the communicator 29. The trigger images and the ambient images can be in a form perceptible by the user and can include visual images, aural images, odor images, and combinations of the same. The selection of trigger images is only limited by the imagination of the seller who selects the image. The trigger image can be related or unrelated to the product or service for sale. Ambient images are collected by the augmented reality device 14 using a camera, an audio recorder, scent detectors and combinations of the same.

Visual images can include single images or multiple images taken over a time period such as in a video image. The visual images can be of a sponsored product, a product in the same product category as a sponsored product, a competitive product or competitive service to a sponsored product or sponsored service, a representation of a sponsored service, a service in the same service category as a sponsored service, a competitive service to a sponsored service, a product packaging of a sponsored product, a seller of the sponsored product, a location where the sponsored product or sponsored service is available, a building where the sponsored product or sponsored service is available, a building where a competitive product or competitive service is available, a bar code, a two dimensional bar code, a QR code, a universal product code, a logo, a trademark, a trade name, a weather condition, an animal, a plant, a person, a feature of a person, a physical location, a natural landmark, a man-made landmark, a food item, a drink item, a light of a particular frequency, frequency range, intensity or pattern of flashing, an object having a particular shape, an object moving in a pattern, and combinations of the same.

Say for example, an ambient image is of a consumer product such as COMET® cleanser. Upon receiving this image it is compared with trigger images and if COMET® cleanser is a sponsored product, advertisement content for COMET® cleanser can be transmitted to the ARD. Additionally, say that COMET® cleanser is not a sponsored product but AJAX® cleanser is a sponsored product, advertisement content for AJAX® cleanser can be transmitted to the ARD.

Another example includes capturing an ambient image of a light of a particular frequency, frequency range, intensity or pattern of flashing. Such a light source could be placed in a location near the sponsored product or sponsored service and when the image of the light is received and analyzed by one or any of the image servers, advertisement content for the sponsored product or sponsored service associated with the light image will be transmitted to the ARD. This type of advertising can be used indoors and outdoors and can involve a low intensity light or a high intensity light. For example, in an indoor retail application, a low intensity light source can be positioned on a counter, display rack, ceiling or any location where customers come into contact. When the ARD encounters the light, advertisement content will be transmitted to the ARD for perception by the user of the device. Very little space or capital investment would be required of such advertising methodology. Of course, the light source could be replaced with a sound source with the same effect. A set of tones, a particular song, a sound of a certain frequency could trigger the transmission of advertisement content.

Task Library

FIG. 1 also shows a task-server 28 configured to send advertisement content in accordance with a set of rules in a task library. These rules can specify virtually any event specified by a seller to trigger the transmission of advertisement content to a group of ARDs based on target information provided or to all of the ARD locations in the user server. The task library can include conditions such as sending advertisement content based on: a time of day, a specific date, after a specified time interval has elapsed, a time of year, a season of the year, upon the expiration of a product life-cycle of a product purchased by a user, upon the passing of an expiration date on a product purchased by the user, upon the passing of a time period typically separating periodic purchases of a sponsored product or a sponsored service by the user, a weather event, a political event, a world event, an event local to the seller, an event local to the user, an occurrence of an event specified by the user, an occurrence of an event specified by the seller, a sale on a sponsored product or a sponsored service, a promotion of a sponsored product or a sponsored service, an offer, a planned event of the user, and a purchasing trend of a specific sponsored product or a sponsored service. It is contemplated that a purchase history and product life-cycle can be determined from images captured by the ARD. For example, a person could record an image of clothing in his or her wardrobe, transmit the image to the system 10 which analyzes the age, style preferences, and sizes of the clothes to receive clothing purchase recommendations. Another example would be sending images of appliances, vehicles and just about any product you can imagine and seeking out advertisement content of purchase recommendations.

The task-server 28 will also track the messages that have been sent in the past and to whom to avoid having a user being inundated with a number of messages received for the same or related product, and to avoid sending too many messages in total for a given period of time. The task server can also build in safety controls to pause advertising content for example or to provide a warning if the ambient conditions indicate the user is in a potentially dangerous situation.

Augmented Reality Device

Augmented reality is a person's perception of an ambient, physical, real-world environment supplemented by computer-generated sensory input such as visual, sound, odor or haptic. Visual and sound images are described above. Haptic sensory input is that which is perceived by a sense of feel and can be achieved by any method for causing physical, frictional or heat exchange with the skin of a user and includes, for example, vibrations, temperature change, pressure changes, and contact by a moving object.

Figure 2:
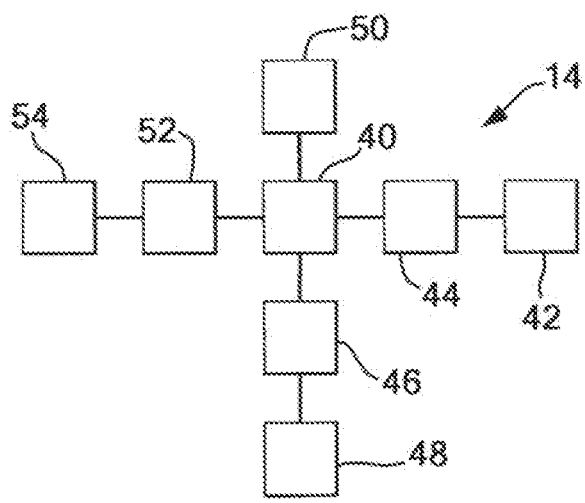
FIG. 2 is a schematic representation of components of an augmented reality device.

FIG. 2 shows an ARD 14 will typically include components such as a processor 40, a data receiver 42, a data transmitter 44, a visual display 46, audio output device 48, haptic output device 50, sensors 52, and a data input device 54. In one preferred form of the invention, the components are housed in a form that is wearable by a user of the ARD. Suitable microprocessors include the types that are included in cellular telephones, tablets, computers, IPAD's, Google Glass and others known to those of ordinary skill in the art.

Suitable data receivers 42 and data transmitters are those that are capable of receiving and transmitting with electromagnetic transmission in analog and digital format using any suitable frequency range such as the ranges used in radio communication, walkie talkie, television, radio, Bluetooth, cordless telephone, Wi-Fi communication, light waves, sound waves, near field communication, and cellular telephone communication. The transmission and reception can optionally include encryption technology.

Suitable visual displays 46 can include any medium of displaying visual images and can include a surface on which an image is projected or electronically displayed. Suitable surfaces for projecting an image can include virtually any surface on which the projected image can be perceived from the projection surface and includes surfaces that are flat, curved or irregular. The surfaces can be of varying physical characteristics such as hard, or soft. The surface can have various optical properties such as transparent, translucent, or opaque. The surface can be fabricated from numerous materials such as fabric, polymeric, metal, glass, wood, ceramic, composite, masonry, or other. In one preferred form of the invention the surface will be an object that can be worn by a user in proximity to an eye of the user and includes a non-corrected eye-glass lens, a vision corrected eye-glass lens, and a visor.

A surface for electronically displaying images can employ technologies such as LCD, LED, plasma, cathode ray, or other. These technologies are well known to those skilled in the art of cellular telephone displays, touch screens, computer monitors, televisions and the like.

Suitable audio output can include any mechanism the can create aurally perceptible stimulus and includes a loudspeaker or bone conduction technology. Loudspeakers produce sound by creating pressure changes in air or other fluid media that can be perceived by a human ear. Loudspeakers can include any type such as those employed by cell phone ear pieces, stereos, radios, and those that are contained within an earphone that fits over the ears or that is worn within the ear canal. Bone conduction technology such as that employed in Google Glass product relies on vibrating the skull of a user to create an audio output.

Suitable haptic output includes any device for creating stimulus that can be perceived by a sense of feel by a user. Haptic feedback is commonly found in data entry devices, for example, cellular phone keypads using soft keys. Soft keys are those where there is no physical button to push, rather there is a graphical representation of a key on a touchscreen display. Haptic feedback confirms that a soft key has been pressed by vibrating the surface in a location where it was touched. Haptic feedback can also be accomplished by any contact of sufficient force on the skin of a healthy human subject to be perceived. Thus a haptic feedback device can touch the skin, vibrate the skin, rub against the skin, pinch the skin, squeeze the skin, or any combination thereof. Haptic feedback can also result from a change in temperature that can be detected. Thus, haptic feedback can be in the form of increasing or decreasing the temperature of the skin of the user.

The sensors 52 can include numerous types of sensors such as a camera, an audio recorder, a GPS device, a compass, an accelerometer, an odor detector, altimeter, barometer, thermometer (for both the user's body temperature and for the ambient conditions), pedometer, light detector, motion detector, a heartbeat monitor, blood-oxygen level monitor, blood sugar level monitor, odometer, or the like.

The input device 54 can be any device capable of data input by a user or through digital or electrical coupling with a source of data. Suitable user input devices include a keyboard, touchscreen, virtual keyboard, touchpad, mouse, or other device manipulated by a user. Data input can also be in the form of oral input through voice and voice commands. The data input device can also be configured to receive digital or analog data from an outside source. The device 54 can also be adapted with other input modes for coupling to other devices to increase or improve the functionality of the ARD.

Google Glass

Google Glass is soon to be released for public sale. Reports from people who have used prototypes have explained the functionality on websites such a YouTube. Google Glass will have a frame that mounts on a user's head, much the same as a pair of eye glasses, and support an optical display positioned over one eye. The device can be controlled using a touchpad on a side of the device or by voice commands. The device has a camera for capturing single images or audio video images. The device has Bluetooth and Wi-Fi capabilities, a 3-axis gyroscope, a 3-axis magnetometer, a 3-axis accelerometer, ambient light sensing and motion detection sensors, and a bone conduction transducer. The Google Glass is powered by lithium ion batteries, utilizes a Texas Instruments OMAP 4430 SoC 1.2 Ghz Dual (ARMv7) microprocessor and Android 4.04 and higher operating platform.

Methods

Figure 3:
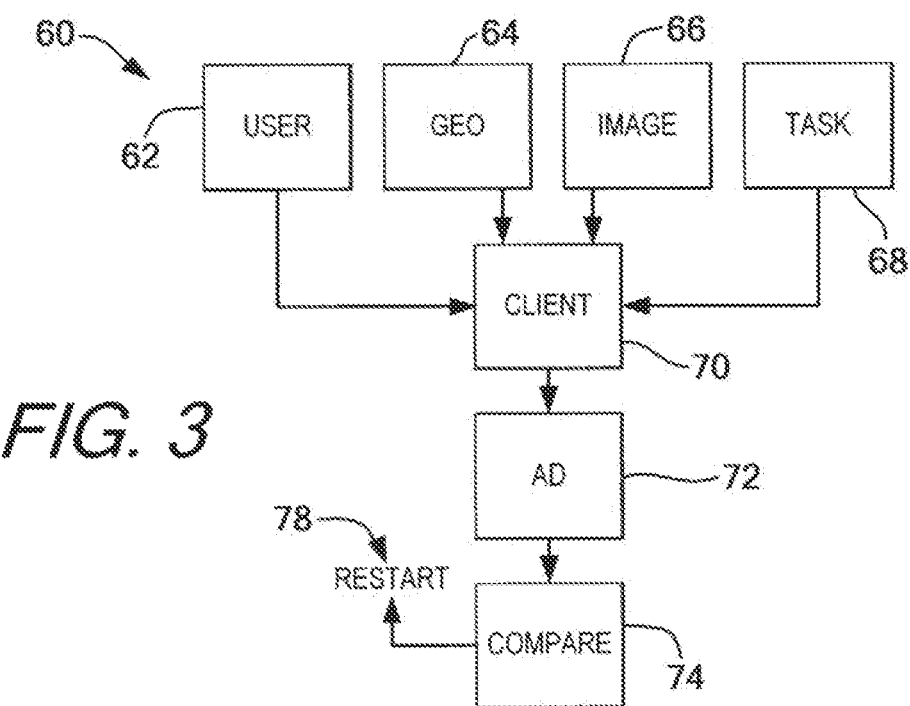
FIG. 3 is a flowchart of a method for automatically transmitting advertisement content to an augmented reality device for perception by a user.

FIG. 3 shows the steps of an automated method for delivering advertisement content perceptible by a user of an augmented reality device. The steps include providing at least one of: (a) a user-server 62 for gathering target information about potential products and services needed, desired or appropriate for the user; (b) a geolocation-server 64 for gathering geolocation information of the augmented reality device; (c) an ambient-image server 66 for gathering ambient image information from the augmented reality device; and (d) a task-server 68 for storing a library of events specified to trigger the transmission of advertisement content. The method also includes the step of providing a client-server 70 for storing identifying information of sponsored products or sponsored services available for use or sale by a seller. The method also includes providing an advertisement-server 72 for storing advertisement content associated with each sponsored product or sponsored service. The method also requires the step of providing a comparator 74 for correlating the identifying information with one of the target information, the geolocation information, the ambient-image information, the events, or any combination thereof to determine a degree of similarity and upon exceeding a pre-determined threshold value, selecting the advertisement content associated with the sponsored product or sponsored service. Finally, the method includes electronically transmitting the selected advertisement content to the augmented reality device to be sensed by the user. If no match is found the method restarts 78 with the next cycle.

Thus, the method of FIG. 3 has essentially four subsets and combinations of the four. The four subsets are defined by the type of server provided: the user-server 62, the geolocation-server 64, the ambient-image-server 66, or the task-server 68. Each subset will be discussed separately below.

Method with User-Server

Figure 4:
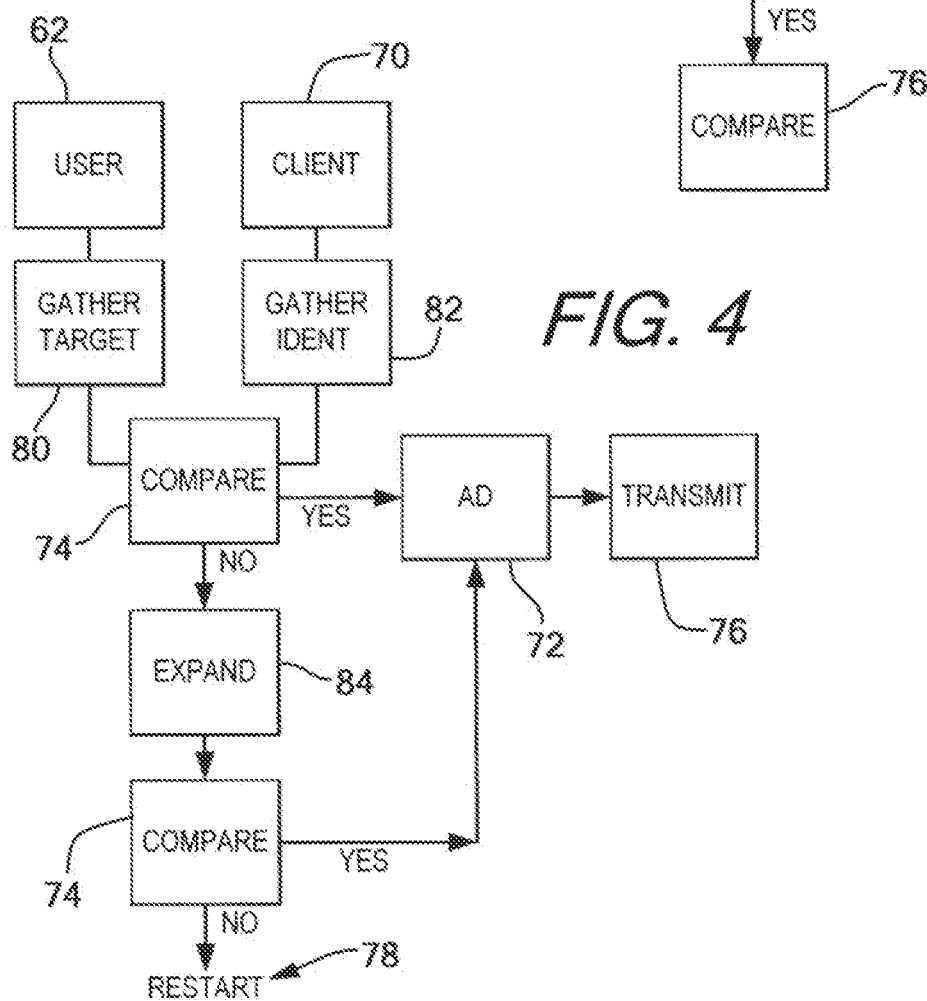
FIG. 4 is a flowchart of one preferred method for comparing target information with identifying information.

The first subset of the method 60 shown in FIG. 4 includes the steps of providing the user server 62, gathering target information and storing 80 on the user server, gathering identifying information and storing 82 on the client server 70, comparing the target information with the identifying information and if there is a match transmitting 76 the advertisement content on the advertisement server 72 with the communicator 76. If there is not a match the target information, the identifying information or both are expanded 84 and then compared, as described in detail above, and if there is a match transmitting 76 the advertisement content on the advertisement server 72 with the communicator 76 to the ARD. If there is not a match, then the method is restarted 78. It should be understood that the step of expanding the identifying information, the target information, or both could be done before the first comparison step and eliminate the second comparison step. Many of the details of the steps and the definition of the terms are set forth above.

Method with a Geolocation-Server

Figure 5:
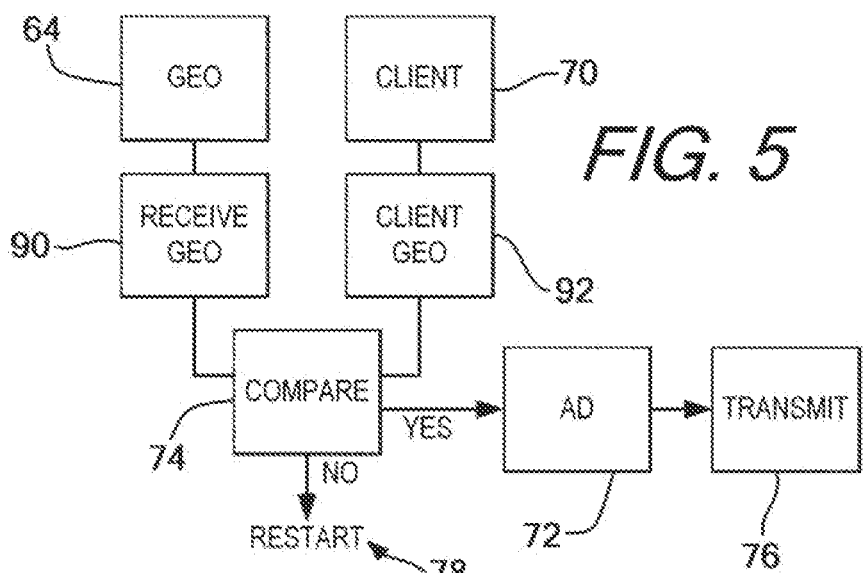
FIG. 5 is a flowchart of one preferred method for using geolocation information of an augmented reality device to transmit advertisement content of a proximal seller to the device.

The second subset of the method 60 shown in FIG. 5, includes the steps of providing the geolocation server 64, receiving geolocation information of the ARD and storing 90 on the geolocation server 64, gathering geolocation information of a seller and storing 92 on the client server 70, comparing 74 the ARD geolocation information with the seller geolocation information, and if the distance less than a predetermined distance, selecting advertisement content from the ad server 72 associated with the proximal seller and transmitting 76 to the ARD 14. If there is not a match, then the method is restarted 78. Many of the details of the steps and the definition of the terms are set forth above.

Method with an Image Server

Figure 6:
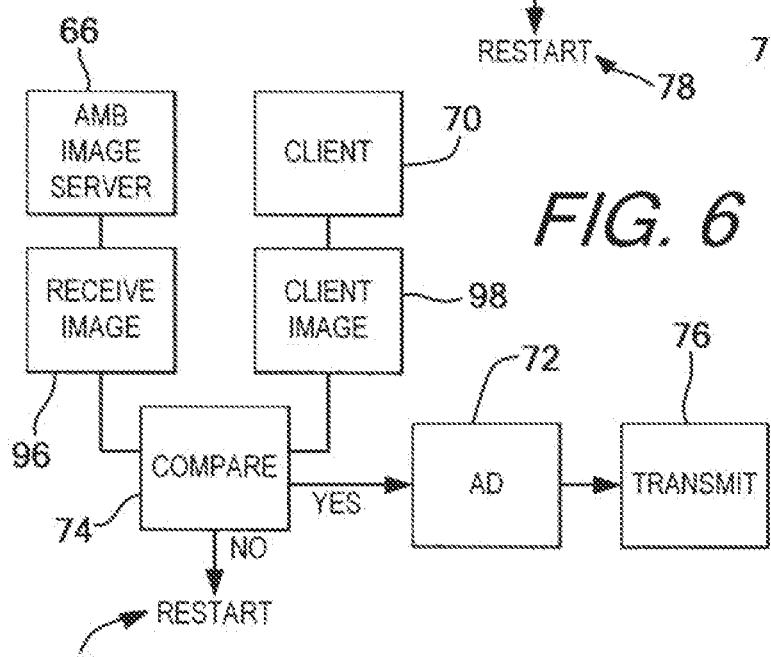
FIG. 6 is a flowchart of one preferred method for using ambient images collected by a augmented reality device in selecting advertisement content to be transmitted to the device.

The third subset of the method 60 shown in FIG. 6, includes the steps of providing the ambient-image-server 66, receiving an ambient image from the ARD and storing the image 96 on the image server 66, gathering client image information of a seller and storing 98 on the client server 70, comparing 74 the ambient image information with the seller image information, and if there is sufficient similarity, selecting advertisement content from the ad server 72 associated with the seller image and transmitting 76 to the ARD 14. If there is not a match, then the method is restarted 78. Many of the details of the steps and the definition of the terms are set forth above.

Method with a Task Server

Figure 7:
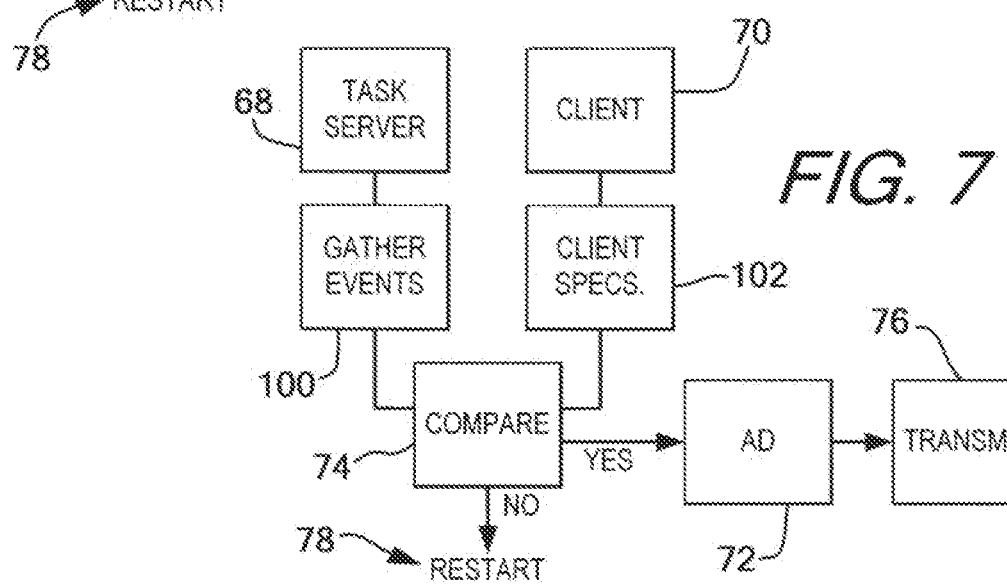
FIG. 7 is a flowchart of one preferred method for using a task-server to determine the occurrence of a specified event to trigger the sending of advertisement content to the augmented reality device.

The fourth subset of the method 60 shown in FIG. 7, includes the steps of providing the task-server 66, gathering information of events 100, gathering client-specified events 102 to trigger the transmission of advertisement content to the ARD, comparing the gathered event information with the client-specified events 74, and if there is sufficient similarity, selecting advertisement content from the ad server 72 associated with the client-specified event and transmitting 76 the advertisement content to the ARD 14. If there is not a match, then the method is restarted 78. Many of the details of the steps and the definition of the terms are set forth above.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims. The appended claims should be construed broadly and in a manner consistent with the spirit and the scope of the invention herein.

The invention claimed is:

1. A method of electronically communicating with an augmented reality device worn by a user in an ambient environment comprising:

providing an augmented reality device having a first processor, a data receiver, a data transmitter, a camera, and an accelerometer, and a GPS device;

capturing a speed of the augmented reality device using the accelerometer;

determining the geographical location of the augmented reality device using the GPS device;

capturing a photographic image of the ambient environment using the camera;

transmitting a signal representative of the speed of the augmented reality device, the geographical location of the augmented reality device, and the photographic image with the data transmitter to a server remote from the augmented reality device;

determining with the server having a second processor, a memory, a communicator, and software when executed by the second processor, based on a set of business rules, that one of the signals representative of the geographical location and the photographic image triggers a requirement to send a message from the server to the augmented reality device;

counting with the second processor a number of messages sent from the server to the augmented reality device over a period of time to define a message sending rate;

comparing with the second processor the message sending rate with a threshold maximum message sending rate and generating a first signal that the requirement to send the message is satisfied;

comparing with the second processor the speed of the augmented reality device to a threshold maximum speed and generating a second signal that the requirement to send the message is satisfied;

determining that the first signal and the second signal have been generated; and, sending with the communicator the message to the augmented reality device.

2. The method of claim 1 wherein the augmented reality device further comprises an audio recorder and a data input device.

3. The method of claim 1 wherein the augmented reality device further comprises a gyroscope.

4. The method of claim 1 wherein the augmented reality device further comprises a magnetometer.

5. The method of claim 1 wherein the accelerometer is a 3-axis accelerometer.

6. The method of claim 1 wherein the augmented reality device further comprises a bone conduction transducer.

7. The method of claim 1 wherein the augmented reality device further comprises an optical display.

8. The method of claim 1 wherein the augmented reality device further comprises a battery.

9. The method of claim 8 wherein the battery is a lithium ion battery.

10. The method of claim 1 wherein the augmented reality device further comprises a Bluetooth communicator.

11. The method of claim 1 wherein the augmented reality device further comprises a Wi-Fi communicator.

12. The method of claim 1 wherein the augmented reality device further comprises a haptic feedback system.

13. The method of claim 1 wherein the augmented reality device further comprises a heartbeat monitor.

14. The method of claim 1 wherein the augmented reality device further comprises a blood-oxygen level monitor.

15. The method of claim 1 wherein the augmented reality device further comprises a blood sugar level monitor.

16. The method of claim 1 wherein the augmented reality device further comprises an odometer.

17. The method of claim 1 wherein the augmented reality device further comprises a date entry device.

18. The method of claim 17 wherein the data entry device is a touchpad.

19. The method of claim 17 wherein the data entry device responds to voice commands.

20. The method of claim 1 wherein the augmented reality device further comprises a frame that mounts on a user's head.

* * * * *